Sept. 14, 1926.  
E. C. PÉNIN  
1,599,484  
FILM HOLDING DEVICE  
Filed Jan. 14, 1924
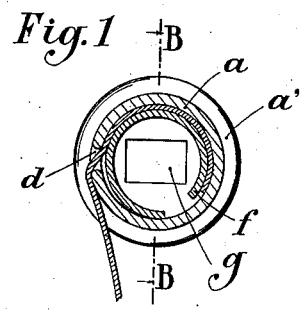
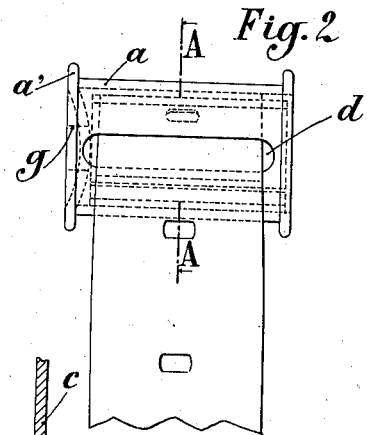
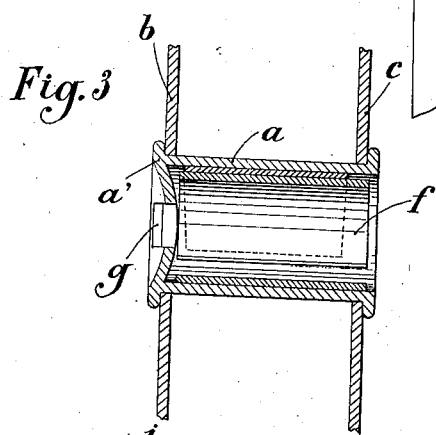
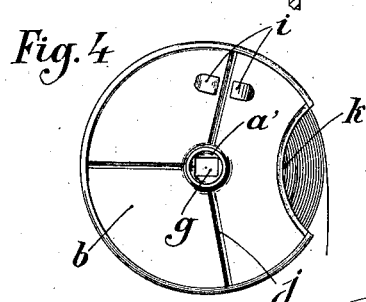
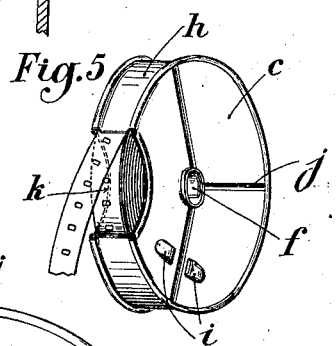
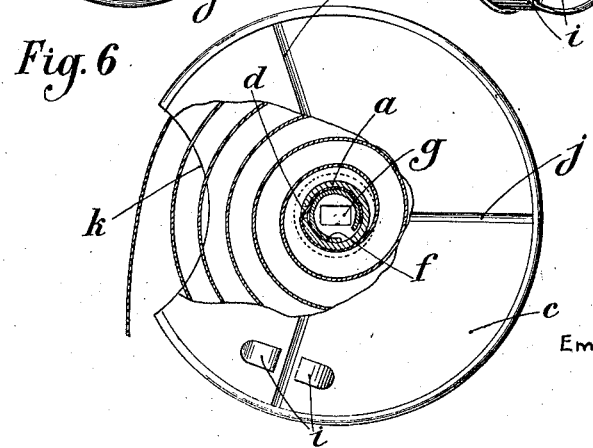
Emile Christian Pénin
INVENTOR
By
his Attorney Patented Sept. 14, 1926.

1,599,484

UNITED STATES PATENT OFFICE.

EMILE CHRISTIAN PÉNIN, OF JOINVILLE-LE-PONT, FRANCE, ASSIGNOR TO PATHÉ CINÉMA, ANCIENS ETABLISSEMENTS PATHÉ FRERES, OF PARIS, FRANCE.

FILM-HOLDING DEVICE.

Application filed January 14, 1924, Serial No. 686,055, and in France February 23, 1923.

This invention relates to film holding devices: storage reels, spools and the like wherein the film is attached to a revoluble central core, and has for its object a device permitting to attach readily and effectively the cinematographic film or photographic film to said revoluble core.

The invention further comprises the combination of this attaching device with a film-holding spool in which the film is contained and protected in a permanent manner and which is particularly adapted for use in toy motion picture apparatus, educational apparatus and other motion picture projection apparatus.

In the appended drawing, given by way of example:

Fig. 1 is a cross-section on the line A—A, (Fig. 2) showing the attaching device, according to the invention.

Fig. 2 is an elevational view.

Fig. 3 is a longitudinal section on the line B—B (Fig. 1).

Fig. 4 is a side view of a film-holding spool with which this attaching device is combined.

Fig. 5 is a perspective view of the same.

Fig. 6 is a side view thereof on a larger scale, with parts broken away, the spiral turns of the film being shown as spaced apart for the sake of clearness.

As shown in the drawing, the film is attached on the revoluble tubular core $a$ consisting of a metallic sleeve for example of brass, which is adapted to rotate loosely at its ends in the two side walls $b$ $c$ of the reel or film-holding spool. The ends of this core are pressed so as to form small flanges which prevent the core from moving axially. This core is provided with a longitudinal slot $d$ and it contains a removable spring $f$ of tubular shape. In order to attach the film to the core, one pushes the spring axially so as to force it out of the core and the end of the film is engaged through the slot $d$ within the said core. The spring is then engaged axially within the spiral turn formed by the end of the film within the core, while slightly compressing this spring. When expanding, the spring will strongly press the end of the film against the internal wall of the core, and the film is thus fixed to this core in a reliable manner. Obviously if it is desired to detach the film from the core, the spring will be drawn axially so as to release the inner end of the film, by drawing upon the film the latter is then disengaged from the core without any difficulty.

At one of its ends, the core comprises preferably an end wall $a'$ which may be stamped and which has a rectangular aperture $g$ in which the element of the projection apparatus which ensures the rewinding of the film and optionally its unwinding, is adapted to be engaged.

This device may be advantageously combined with the film-holding spools which are used in particular with cinematographic films of relatively small size such as are employed for toy motion picture apparatus, educational apparatus and like projection apparatus. Figs. 4 to 6 show a film holder of this kind with which the above described attaching device is combined. This film holder consists of a cylindrical rigid flat box which is not dismountable and is made preferably of two sheet metal flanges $b$ $c$ upon which is set a cylindrical wall $h$. Bosses $i$ can be formed on the cheeks of this box and are adapted to meet suitable stop-pieces carried by the projection apparatus, so as to prevent the film holder from turning in the projection apparatus. Ribs $j$ can also be formed in order to reinforce said flanges. A large opening $k$ allows of readily seizing the free end of the film in order to engage it with the driving mechanism of the projection apparatus. The revoluble core $a$ which is made as above stated, rotates at the center of this box.

The following advantages of this film holder are as follows:

The film, since it cannot become detached by itself from the film holder, will never leave the film holder, so that it cannot be put pell-mell as happens with usual film-holding spools. Further one can easily unwind and rewind it up, without needing to again fix its end to the core. Since the film always forms a unit with the holder, one can provide this latter, for example on its edge, with a label showing the title of the film, and this is very convenient. Further, due to the combination with this holder of the removable core above described, the attaching of the film is very easy, and if need be, one can readily remove it for example to replace a worn out or a damaged film, without danger of putting the film holder out of use.

Further, the core cannot be distorted, which would prevent it from turning loosely in the side walls of the holder, and the whole device is light and substantial and can be made in a very simple and economical manner; which is most important, chiefly for the film spools for educational apparatus or toy apparatus, which do not occasion a commercial exploitation.

In practice, it is desirable to provide the film and the projection apparatus with any known means, so that the traction exerted upon the film during the projection shall cease when the projection is completed, and hence the film cannot be torn from the core.

Having now described my invention what I claim as new and desire to secure by Letters Patent is:

In a film holding device for cinematographic films and the like with a central tubular core with smooth interior surface, open at at least one end, rotatable between the side walls of a casing and provided with a slot through which one end of the film may be inserted, the use of a removable cylindrical elastic blade adapted to be laterally and slidably inserted into said core through the open end of said core for fastening the inner end of the film.

In testimony whereof I have signed my name to this specification.

EMILE CHRISTIAN PÉNIN.